United States Patent [19]
Gonzalez

[11] Patent Number: 6,031,009
[45] Date of Patent: Feb. 29, 2000

[54] POLYOLEFIN BLENDS CONTAINING GROUND VULCANIZED RUBBER

[76] Inventor: Edgar Armando Gonzalez, 14555 Eby Rd, Creston, Ohio 44217

[21] Appl. No.: 08/976,593

[22] Filed: Nov. 24, 1997

[51] Int. Cl.[7] .............................. C08J 11/06; C08L 9/06; C08L 7/00; C08L 9/00
[52] U.S. Cl. ........................ 521/41; 521/45.5; 525/232; 525/237; 524/424; 524/426; 524/431
[58] Field of Search .................... 521/41, 45.5; 525/232, 525/237; 524/424, 426, 431

[56] References Cited

U.S. PATENT DOCUMENTS

| | | | |
|---|---|---|---|
| 4,386,182 | 5/1983 | Zijp | 524/375 |
| 5,157,082 | 10/1992 | Johnson | 525/237 |
| 5,506,274 | 4/1996 | Brown | 521/41 |
| 5,635,551 | 6/1997 | Lee | 525/232 |

*Primary Examiner*—Donald R. Wilson

[57] ABSTRACT

Improved thermoplastic compositions comprising a blend of ground vulcanized rubber and olefin polymer which have improved compatibility and mechanical properties are described; they are improved by incorporation of an alpha olefin copolymer.

13 Claims, No Drawings

POLYOLEFIN BLENDS CONTAINING GROUND VULCANIZED RUBBER

TECHNICAL FIELD

This invention relates to improved thermoplastic compositions which, while having the processability of a thermoplastic polymer, are elastomeric in nature. The result of this invention is accomplished by blending ground vulcanized rubber with a thermoplastic olefin polymer in the presence of an alpha olefin copolymer.

BACKGROUND OF THE INVENTION

Thermoplastic compositions consisting of blends of ground vulcanized rubber and olefin polymer are known; see U.S. Pat. No. 5,157,082. That patent discloses improved compositions comprising a blend of ground vulcanized rubber and a olefin polymer obtained by the incorporation of a functionalized olefin polymer. However, there is a definite need for improved blends of ground vulcanized rubber and olefin polymer in light of the large number of discarded tires and waste rubber articles which are not being reclaimed. As will be shown in a comparative example below, the mechanical properties of the '082 compositions (i.e. % elongation at break) are inferior relative to the mechanical properties of the compositions of the subject invention.

The quality of a rubber-plastic blend depends partly upon the mutual compatibility between the two components. When an olefin polymer and a rubber polymer are incompatible (such as when an olefin polymer and ground vulcanized rubber from tires are mixed) poor mechanical properties result when the mixing occurs without compatibilization. However, a wide range of properties can be obtained when different compatibilizers are used. Much work is being done to continue to apply the principles of compatibilization to develop new blends of different materials which are normally incompatible. This includes the compatibilization of ground vulcanized rubber/polymer blends to improve blend properties. Therefore, if the compatibilization of the ground vulcanized rubber/olefin polymer blend can be improved, improved compositions would be obtained.

SUMMARY OF THE INVENTION

In accordance to this invention it has been discovered that thermoplastic compositions comprising a blend of ground vulcanized rubber, thermoplastic olefin polymer and an alpha olefin copolymer are tough, strong elastomeric compositions processable as thermoplastics and have improved mechanical properties compared to blends of similar composition. The improved mechanical properties of the compositions of the present invention indicate improved compatibility between the ground vulcanized rubber and the olefin polymer.

More specifically, improved thermoplastic compositions of the invention comprise (a) ground vulcanized rubber in the form of small dispersed particles, (b) olefin polymer, and (c) and alpha olefin copolymer, and, if desired, additives such as fillers, pigments, reinforcements, stabilizers, processing aids, colorants, plasticizers and other compounding or modifying ingredients may be included in order to meet specific performance needs of each customer. The melt processability of these compositions allows shaped articles of these compositions to be molded therefrom without the time consuming cure step required with conventional thermoset rubbers, thereby, reducing finished part cost.

DESCRIPTION OF THE PREFERRED EMBODIMENTS

Component (a) is mechanically or cryogenically ground vulcanized rubber in the form of small particles essentially of 1.5 mm number average or below and more preferably a particle size between 0.1 mm and 1.0 mm number average. Exemplary of the vulcanized rubber include natural rubber, synthetic polymer and copolymer rubber derived from alkadienes, and mixtures thereof. For economic reasons, ground vulcanized rubber from scrap tires, retreaded tire buffings, tire tubes, and miscellaneous waste thermoset rubber articles, with subsequent removal of ferrous constituents and other contaminants, is especially preferred for purposes of the subject invention.

The olefin polymer listed as component (b) is a solid, high molecular weight polymeric material made by polymerizing one or more olefinic monomers in a conventional manner. Examples of such olefins are ethylene, propylene, butadiene, isoprene, and mixtures thereof. Preferred olefin polymers are polyethylene or polypropylene.

The alpha olefin copolymer listed as component (c) is a copolymer of at least one olefin and one or more alpha olefins. Preferred olefins include ethylene, propylene, butadiene, isoprene, including hydrogenated butadiene and isoprene. Preferred alpha olefins in accordance to this invention are alpha olefins containing 2–10 carbon atoms. Examples of such alpha olefins are 1-butene, 1-pentene, 1-hexene, 2-methyl-1-propene, 3-methyl-1-pentene, 4-methyl-1-pentene, 5-methyl-1-hexene, 1-octene, or mixtures thereof. Of course, more than one of these alpha olefins may be copolymerized with an olefin to form the alpha olefin copolymer useful in the practice of the subject invention. Preferred alpha olefin copolymers contain at least one olefin copolymerized with one or more alpha olefins using single-site catalysts. Examples of such catalysts are metallocene single-site catalysts, which make polymers with uniform, narrow molecular distribution and higher comonomer content compared to Ziegler-Natta catalysts. Examples of alpha olefin copolymers are copolymers of ethylene and 1-butene available from Exxon Chemical Company under the trade name EXACT and copolymers of ethylene and 1-hexene available from Union Carbide under the trade name FLEXOMER. The industrial technology that is used for making single-site olefin copolymers is known and is covered in several U.S. patents. Examples of such technology include U.S. Pat. Nos. 5,272,236 issued Dec., 1993 and 5,278,272 issued Jan., 1994. Generally, the amount of alpha olefin monomer is used at a rate of about 0.5 to 30 parts by weight per 100 parts by weight of alpha olefin copolymer.

Although not essential components of the compositions of this invention, various amounts of any number of conventional fillers or compounding ingredients may be admixed. Examples of such ingredients include various carbon blacks, clay, silica, alumina, calcium carbonate, titanium dioxide, pigments, flame retardants, reinforcements, stabilizers, curing agents, anti-oxidants, anti-degradants, tackifiers, processing aids such as lubricants and waxes, plasticizers, etc. The amount used depends, at least, in part, upon the quantities of the ingredients in the composition.

A blend composition of the present invention may be manufactured in a single operation or in a number of operational steps. In the single step operation the vulcanized rubber particles, the alpha olefin copolymer and the olefin polymer, with the necessary fillers and additives are charged at the desired rates to a suitable mixer, for example, a Banbury internal mixer, two roll mill or extruder, or any device that will allow efficient mixing of the blend at the desired temperature to obtain a composition of the invention. Alternatively, as an example of a multistep operation, a composition of the invention may be prepared by first separately mixing a blend of ground vulcanized rubber and olefin polymer. The independently prepared blend is then melt mixed together with the alpha olefin copolymer in conventional mixing equipment to obtain a composition of the invention. The blending is done at a temperature high enough to soften the polymers for adequate blending, but not so high as to degrade the polymers. Generally speaking, this blending temperature ranges from 140 to 200 C, and blending is carried out for a time sufficient to homogeneously blend the components.

In accordance to this invention, the relative proportions of the vulcanized rubber particles, olefin polymer and the alpha olefin copolymer depend, at least in part, upon the type and molecular weight of the rubber, olefin polymer and alpha olefin copolymer, and the presence of other ingredients in the composition such as fillers, reinforcements plasticizers, etc. In general, the compositions of the invention comprise about 10–90 parts by weight of ground vulcanized rubber, and correspondingly, about 90–10 parts by weight of olefin polymer. Compositions comprising about 20 to about 80 parts by weight of ground vulcanized rubber, and correspondingly, about, 80 to about 20 parts by weight of olefin polymer are preferred. An amount of alpha olefin copolymer which is sufficient to improve the compatibility between the ground vulcanized rubber and the olefin polymer is satisfactory for the compositions of the invention. Improved compatibility is generally indicated by an increase in elongation or tensile strength or both. An increase in elongation of 25%, preferably 50% or more, indicates improved compatibility. The amount of alpha olefin copolymer required is readily determined by incrementally increasing the amount of alpha olefin copolymer in the blend until the improved properties are observed. Generally, at least 0.5 part by weight of alpha olefin copolymer per 100 parts by weight of olefin polymer is enough to observe an improvement in compatibility. Typically, the amount of alpha olefin copolymer is about 0.5 to 50 parts by weight per 100 parts by weight of olefin polymer. Increasing the amount of alpha olefin copolymer within this range usually increases compatibility. Of course, it is understood that the alpha olefin copolymer may replace all of the olefin polymer if desired, but the improvement in properties may not be substantially greater than what is obtained by the use of lesser quantities of alpha olefin copolymer.

The blend compositions of the subject invention are melt processible using conventional plastic processing equipment. The properties of the blend depend upon the properties of the components with a wide range of properties being available simply by varying the proportions of the blend components. Blends containing high proportions of ground vulcanized rubber are elastoplastic, which means they are elastomeric, but can be processed using conventional plastic processing equipment. In addition, the melt processability of these compositions allows shaped articles of these compositions to be molded therefrom without the time consuming cure step required with conventional rubbers thereby reducing finished part cost significantly. Blends containing high proportions of olefin polymer are moldable, rigid thermoplastic compositions exhibiting improved impact resistance. Since in process scrap can be remelted and recycled there is no waste, resulting in additional cost savings. The thermoplastic nature of the compositions of the subject invention enables shaped articles made from such compositions to be recycled in the same manner as conventional thermoplastics, thus helping to alleviate the growing environmental problem of solid waste disposal. In addition, the composition of the subject invention is adaptable to reprocessing of vulcanized rubber from scrap tires and, therefore, it can serve environmental protection by reducing solid waste and the fire/health hazards associated with above ground storage of tires. Improved compositions of the invention can be used to form a variety of molded, extruded, or calendered articles. Various uses for the compositions of the invention include seals and gaskets, automotive parts, anti-skid surfaces, and reinforced hoses. They can be used to coat fabric, industrial belts and various hard surfaces by extrusion coating. They also find utility as impact modifiers for other polymer systems. Compositions within the scope of this invention can be used as the protective covering of reinforced or unreinforced tubes of similar or different compositions.

The subject invention will be more fully appreciated with reference to the examples that follow. In the stated nonrestrictive examples all percentages are by weight of total composition unless otherwise indicated.

EXAMPLE 1

The vulcanized rubber particles were obtained by grinding passenger car tires, consisting mainly of SBR rubber. The average particle size was 0.5 mm. The rubber particles, alpha olefin copolymer and olefin polymer were mixed in a Brabender mixer at 100 RPM with the oil bath controlled at 180–190C for five minutes. After blending, to demonstrate that the compositions were melt processible, each batch was placed in a picture frame mold at ambient temperature and compression molded into sheet 2.0 mm thick in a hydraulic press, both platens of which had been preheated to 200C. The press was heated for an additional 5 minutes. The molded sheet was then rapidly cooled under pressure to ambient temperature and removed from the press. Test specimens were die cut from the molded sheet and used after 24 hours storage at room temperature. The molded sheet samples were re-melt processable.

The stress-strain properties of the compositions are determined in accordance with the procedures set forth in ASTM D-412. Test specimens are pulled with an Instron Tester at 20.0 inches per minute to failure. The properties are shown in Table 1. True stress at break (TSB) is the tensile strength (TS) at break multiplied by the extension ratio also at break. Extension ratio is the length of a tensile test specimen at break divided by the original, unstressed length of the test specimen. Alternately, extension ratio is 1.00 plus 1/100 of the percent ultimate elongation (EL).

Blend compositions are prepared which contain the ingredients in Table 1. Batch A is a control containing unmodified polypropylene. Batch B is a control containing unmodified polyethylene. Batch C illustrates an improved composition of the invention. The data show that the incorporation of an alpha olefin copolymer results in substantial improvement in elongation. True stress at break, TSB, shows a 4 to 5 fold increase over the controls.

TABLE 1

By the same procedure as Example 1, the following compositions were

|  | A | B | C |
| --- | --- | --- | --- |
| Rubber (1) | 60 | 60 | 60 |
| PP (2) | 40 | — | 15 |
| PE (3) | — | 40 | — |
| E/1-OCTENE (4) | — | — | 25 |
| Shore Hardness (5) | 46D | 42D | 24D |
| Tensile at Break, psi (6) | 1249 | 1177 | 850 |
| Elongation at break, % (6) | 25 | 35 | 690 |
| M100, psi (6) | — | — | 510 |
| TSB (7) | 1561 | 1589 | 6715 |

(1) Rubber = Ground passenger car tires, 0.5 mm average particle size
(2) PP = Polypropylene
(3) PE = Polyethylene
(4) E/1-OCTENE = Etbylene/1-Octene copolymer
(5) ASTM D-2240
(6) ASTM D-412
(7) TSB = True stress at break = TS(1 + EL/100)

COMPARATIVE EXAMPLE 2

By the same procedure as Example 1, the following compositions were blended (values are in weight percent). Batches B and C were prepared using a functionalized olefin polymer in accordance with Example 1 of U.S. Pat. No. 5,157,082. The results show that the blend produced with an alpha olefin copolymer has superior mechanical properties (Table 2).

TABLE 2

|  | A | B | C | D |
| --- | --- | --- | --- | --- |
| Rubber (1) | 60 | 60 | 60 | 60 |
| PP (2) | 40 | 15 | 15 | 15 |
| EVA (3) | — | 25 | — | — |
| S(EB)S (4) | — | — | 25 | — |
| E/1-OCTENE (5) | — | — | — | 25 |
| Shore Hardness | 46D | 26D | 23D | 24D |
| Tensile at break, psi | 1249 | 825 | 760 | 850 |
| Elongation at break, % | 25 | 221 | 241 | 690 |
| M100, psi | — | 610 | 550 | 510 |
| TSB | 1561 | 2648 | 2592 | 6715 |

(1) Rubber = Ground passenger car tires, 0.5 mm average particle size
(2) PP = Polypropylene
(3) EVA = Ethylene vinyl acetate copolymer (25% VA)
(4) S(EB)S = Triblock copolyer consisting of styrene end blocks and poly-(ethylene/butylene) midblocks, (29% styrene)
(5) E/1-OCTENE = Ethylene/1-octene copolymer Although the invention has been illustrated by typical examples, it is not limited thereto. Charges and modifications of the examples of the invention herein chosen for the purpose of disclosure can be made which do not constitute departure from the spirit and scope of the invention.

What is claimed is:

1. Improved thermoplastic compositions comprising a blend of about 10–90 parts by weight of ground vulcanized rubber in the form of small dispersed particles essentially of 1.5 mm number average or below, wherein said rubber is selected from the group consisting of natural rubber, synthetic polymer and copolymer rubber derived from alkadienes, and mixtures thereof, and correspondingly, about 90–10 parts by weight of one or more conventional olefin polymers and at least 0.5 parts by weight of one or more metallocene single site catalyzed alpha olefin copolymer per 100 parts by weight said conventional of olefin polymer wherein said alpha olefin copolymer is present in an amount effective to increase the elongation at break of the composition by 25% measured according to ASTM D-412, and is a copolymer of at least one olefin and at least one alpha olefin.

2. The composition of claim 1 wherein the ground vulcanized rubber is obtained by grinding scrap tires, retreaded tire buffings, tire tubes or waste thermoset, rubber articles.

3. The composition of claim 1 wherein is incorporated 0–300 parts by weight percent based on the composition of one or more additives, selected from the group consisting of carbon black, clay, silica, alumina, calcium carbonate, titanium dioxide, pigments, flame retardants, antioxidants, antidegradents, tackifiers, reinforcing materials, lubricants, waxes, and plasticizers.

4. The composition of claim 1 wherein said conventional olefin polymer is selected from the group consisting of polyethylene, polypropylene, polybutadiene, polybutylene, polyisoprene, and mixtures thereof.

5. The composition of claim 4 wherein said conventional olefin polymer is polyethylene.

6. The composition of claim 1 wherein the alpha olefin copolymer is a copolymer of one or ore olefins selected from the group consisting of ethylene, propylene, butadiene and isoprene and one or more alpha olefins selected from the group consisting of 1-butene, 1-pentene, 1-hexene, 2-methyl-1-propene, 3-methyl-1-pentene, 4-methyl-1-pentene, 5-methyl-1-hexene and 1-octene.

7. A process for manufacturing improved thermoplastic compositions which comprises mixing a blend of about 10–90 parts by weight of ground vulcanized rubber in the form of small dispersed particles essentially of 1.5 mm number average or below, wherein said rubber is selected from the group consisting of natural rubber, synthetic polymer and copolymer rubber derived from alkadienes, and mixtures thereof, and correspondingly, about 90 to 10 parts by weight of one or more conventional olefin polymers and at least 0.5 parts by weight of one or more metallocene single site catalyzed alpha olefin copolymers per 100 parts by weight said conventional of olefin polymer at a temperature high enough to soften or melt the polymers, and for sufficient time to obtain a homogeneous mixture wherein said alpha olefin copolymer is present in an amount effective to increase the elongation at break of the composition by 25% measured according to ASTM D-412, and is a copolymer of at least one olefin and at least one alpha olefin.

8. The process of claim 7 wherein the ground vulcanized rubber is obtained by grinding scrap tires, retreaded tire buffings, tire tubes or waste thermoset rubber articles.

9. The process of claim 7 wherein is incorporated 0–300 parts by weight percent based on the composition of one or more additives, selected from the group consisting of carbon black, clay, silica, alumina, calcium carbonate, titanium dioxide, pigments, flame retardants, antioxidants, antidegradents, tackifiers, reinforcing materials, lubricants, waxes, and plasticizers.

10. The process of claim 7 wherein said conventional olefin polymer is selected from the group consisting of polyethylene, polypropylene, polybutadiene, polybutylene, polyisoprene and mixtures thereof.

11. The process of claim 10 wherein said conventional olefin polymer is polyethylene.

12. The process of claim 7 wherein the alpha olefin copolymer is a copolymer of one or more olefins selected from the group consisting of ethylene, propylene, butadiene and isoprene and one or more alpha olefins selected from the group consisting of 1-butene, 1-pentene, 1-hexane, 2-methyl-1-propene, 3-methyl-1-pentene, 4-methyl-1-pentene, 5-methyl-1-hexene and 1-octene.

13. Articles manufactured from the compositions of claim 1.

* * * * *